No. 12,255. REISSUED AUG. 9, 1904.
C. A. BRADEN.
ENGINE.
APPLICATION FILED APR. 6, 1903.
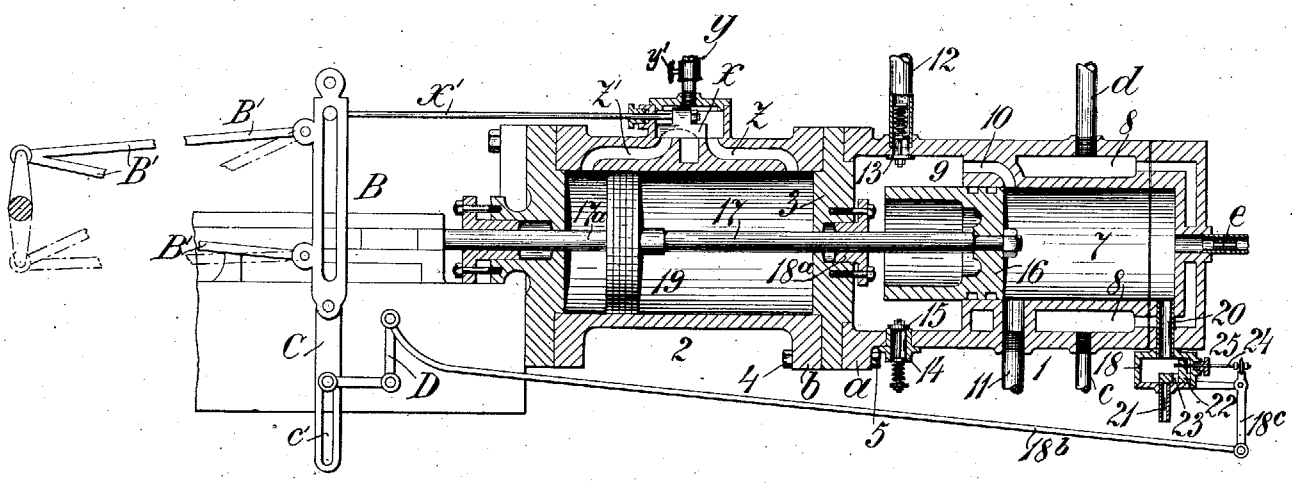
Witnesses
Hans Olsson
E. E. Potter.
Inventor
C. A. Braden
by H. C. Evarts
Attorneys No. 12,255. Reissued August 9, 1904.

UNITED STATES PATENT OFFICE.

CHARLES A. BRADEN, OF BUTLER, PENNSYLVANIA, ASSIGNOR TO THE BRADEN GAS ENGINE COMPANY, A CORPORATION OF WEST VIRGINIA.

ENGINE.

SPECIFICATION forming part of Reissued Letters Patent No. 12,255, dated August 9, 1904.

Original No. 715,008, dated December 2, 1902. Application for reissue filed April 6, 1903. Serial No. 151,927.

*To all whom it may concern:*

Be it known that I, CHARLES A. BRADEN, a resident of Butler, in the county of Butler and State of Pennsylvania, have invented certain new and useful Improvements in Engines; and I do hereby declare the following to be a full, clear, and exact description of the invention, such as will enable others skilled in the art to which it appertains to make and use the same.

My invention relates to an improvement in engines, the object of the invention being to produce an engine which shall be adapted to be operated by the pressure of gas and steam applied independently of each other.

A further object is to provide a reversible gas-engine.

A further object is to provide a combined steam and gas engine which will be neat in appearance, strong and durable, and most effectual and useful when in operation.

With these objects in view the invention consists in certain novel features of construction and combination and arrangements of parts, as will be more fully herein described, and pointed out in the claims.

The accompanying drawing is a view in section illustrating my improvements.

1 represents a gas-engine, and 2 a steam-engine connected therewith and disposed in the same plane. A partition 3 is disposed between the gas-engine cylinder and steam-engine cylinder and is secured in place by means of bolts 4, which pass through openings in a flange *a* on the gas-engine, thence through the partition 3, and thence through a flange *b* on the steam-engine, and said bolts are secured in place by means of nuts 5, as shown. The partition 3 thus constitutes heads for the abutting ends of the two engine-cylinders. The gas-engine cylinder is provided in its wall surrounding the explosion-chamber 7 with a water-jacket 8, which is preferably constantly supplied from any convenient source through an inlet-pipe *c*, the water escaping through a larger outlet-pipe *d*, and thus the water constituting the water-jacket is kept in constant circulation, whereby to maintain the walls of the explosion-chamber cool. The inner end of the gas-engine cylinder 1 constitutes a mixing-chamber 9. The chamber 9 is of a larger diameter than the explosion-chamber and is connected therewith by a passage 10, which communicates with the explosion-chamber 7 at a point approximately in alinement with an exhaust-port 11 of the explosion-chamber. A suitable gas-inlet tube 12, having a spring-actuated valve 13, communicates with the mixing-chamber 9, and an air-inlet tube 14, having a spring-actuated valve 15, also communicates with said mixing-chamber. Any approved igniter *e* may be employed and is preferably located at the extreme end of the explosion-chamber, as usual. A piston 16 is disposed within the explosion-chamber and is secured to a piston-rod 17, which extends through the partition or common head 3, where any approved packing $18^a$ is provided. The piston-rod 17 extends into the steam-engine cylinder, wherein it is provided with a piston 19. A pitman $17^a$ is secured to the piston of the steam-engine and is connected with any approved operating mechanism. Any approved valve mechanism *x* may be employed for the steam-engine, as the particular form of steam-engine is immaterial.

A valve-casing 18 is disposed near the end of the explosion-chamber and communicates therewith by means of a tube or pipe 20. A pipe 21 communicates with said valve-casing in alinement with the pipe 20 for exhausting the gas therefrom. A valve 22 is disposed in said casing 18, and said valve is provided with an opening 23, adapted to aline with the pipes or tubes 20 and 21 to permit the gas to exhaust from the explosion-chamber. A rod 24 is secured to the valve 22 and extends through one side of the valve-casing 18, where any approved packing 25 is provided, and is connected, through the medium of a lever $18^c$, with a rod $18^b$, and the latter is connected, through the medium of an engine-link B, with the valve *x* of the steam-engine. Hence it will be seen that when the opening 23 is in alinement with the pipes or tubes 20 and 21 the combined gas and air can escape from the explosion-chamber and prevent any explosion therein, and when the valve is pushed to one side, with the opening 23 out of alinement with the tubes 20 and 21, the valve will effectually cut off any escape of gas and air from the explosion-chamber, and the gas-engine will be free to perform its functions.

The operation of my improved gas-engine is as follows: Air and gas are admitted to the mixing-chamber 9, and on the forward thrust of the piston 16 the mixed air and gas is forced through the passage 10 into the explosion-chamber 7, and before the air and gas have time to escape through the exhaust 11 the piston returns, closing both passage 10 and exhaust 11 and compressing the air and gas in the outer end of the explosion-chamber, where it will be ignited, the resulting explosion causing the piston 16 to be propelled forwardly, the burned gases finding an exit through the exhaust-pipe 11. When the piston again moves outwardly, it will compress another explosive charge and at the same time serve to draw air and gas into the mixing-chamber for the succeeding charge. When it is desired to reverse the gas-engine, the engine-link B is elevated so as to shift valve $x$ through the medium of rod $x'$. The valve $y'$, located in steam-inlet pipe $y$, is opened, and the valve $x$ having been shifted so as to cover port $z$ the steam is admitted to the steam-cylinder 2 through the port $z'$, in front of the piston 19, and forces this piston, together with the piston 16, rearwardly. The mixing-chamber 9 is necessarily of greater diameter than the explosion-chamber 7, for the reason that the explosion-chamber must act as the working barrel or cylinder for the piston 16, and the chamber 9 must be of a diameter capable of admitting a sufficient quantity of the explosive mixture. If the gas-engine cylinder extended into the steam-cylinder, such space would be provided for; but since I attach direct to the end of any ordinary steam-engine without altering the construction of the latter I obtain the necessary mixing-space by increasing the diameter of the mixing-chamber 9 beyond the diameter of the explosion-chamber 7. The link B is connected to rods B′ B′, attached to eccentrics, (not shown,) so that a rocking movement will be imparted to the said link in order to move the valve $x$, as in the usual construction of valve-gear for steam-engines. At its lower end the link B is pivotally connected to an auxiliary link C, provided in its lower portion with a slot $c'$ to receive a pin or stud carried by one arm of a bell-crank D. This bell-crank is pivotally mounted on the engine-frame and has its other arm pivotally connected to the rod $18^b$. The link B in elevation carries with it the auxiliary link C, and by reason of its being pivotally connected thereto no rocking movement is imparted to the link C, and when the pin in the bell-crank arm engages the lower end of the slot $c'$ the bell-crank is rocked on its pivot, so as to actuate rod $18^b$, and through the medium of the lever $18^c$ and rod 24 the valve 22 is shifted so as to aline its opening 23 with the pipes 20 and 21 in order that the gas and air which was compressed in the explosion-chamber 7 by the rearward stroke of the piston 16 will be discharged through said pipes 20 and 21. As the valve $x$ is returned to its former position through the medium of link B, rod $x'$, and rods B′, so as to admit steam through port $z$ to return the pistons to the position shown, the valve $y'$ in steam-inlet pipe $y$ is closed, the link B lowered, thereby lowering link C, and when the pin in the arm of the bell-crank engages the upper end of slot $c'$ the bell-crank and rod $18^b$ are actuated so as to move valve 22 to a position with its opening 23 out of alinement with the tubes 20 and 21, and the gas-engine will then be free to again operate and has been effectually reversed.

It will be readily seen that it is very desirable, especially in oil countries, to have engines which can be readily reversed. Heretofore gas-engines have been used to pump wells, and steam-engines are left in position to handle tubing, rods, and the like because of their being capable of being readily reversed. By my improved engine I am enabled to employ same not only for pumping, but also for the raising and lowering of the tubing, rods, and the like without any change of engines other than the opening of a valve to start the steam-engine for the purpose of reversing the gas-engine.

Various slight changes might be resorted to in the general form and arrangement of the several parts set forth without departing from the spirit of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a steam-engine cylinder having a piston working therein, of a head forming one end of said cylinder with the piston-rod working therethrough, and a gas-engine cylinder connected to said head in alinement with the steam-engine cylinder, the head forming one end of the gas-engine cylinder and the piston-rod being common to both the gas-engine cylinder and the steam-engine cylinder, substantially as described.

2. The combination with a steam-engine cylinder, of a gas-engine cylinder in horizontal alinement therewith, a partition secured between the mutually-adjacent ends of the cylinders and forming one of the heads of each cylinder, a piston-rod working through the partition with pistons thereon in the respective cylinders, the gas-engine cylinder secured to the partition, the gas-engine being normally operated independently of the steam-engine and reversed through the medium of the latter, and means for exhausting the explosive mixture from the explosive-chamber of the gas-engine when steam is admitted to the steam-cylinder, substantially as described.

3. The combination with a steam-engine of a gas-engine connected to the steam-engine in alinement therewith, the steam-engine acting when started to reverse the gas-engine, a partition separating the cylinders of the two engines and forming one head of each cylinder, the gas-engine normally operating independently of the steam-engine, an explosion-chamber, and a mixing-chamber in the cylinder of the gas-engine, the mixing-chamber being of greater diameter than the explosion-chamber and in communication through a port therewith, an exhaust-valve chamber in communication through a port with the explosion-chamber, a valve in said exhaust-valve chamber, and means connected to the steam-engine adapted to operate said valve to exhaust the explosive mixture from the explosion-chamber when steam is admitted to the steam-cylinder, substantially as described.

4. The combination with a steam-engine, of a gas-engine connected to the steam-engine in alinement therewith, a partition separating the cylinders of the two engines and forming one head of each cylinder, the gas-engine normally operating independently of the steam-engine, an explosion-chamber in the cylinder of the gas-engine, and a mixing-chamber in said cylinder in communication with the explosion-chamber and of greater diameter than said chamber, substantially as described.

5. In a combined steam and gas engine, the combination with a steam-engine cylinder, its piston, a piston-rod extending through both heads of said cylinder, and a reversing-gear, of a gas-engine cylinder arranged in axial alinement with the steam-engine cylinder and having its piston attached to the piston-rod of the steam-cylinder, and a mixing-chamber communicating with the gas-engine cylinder and arranged between the steam-engine cylinder and the gas-engine cylinder and in axial alinement with both, said mixing-chamber being of a larger diameter than the gas-engine cylinder, and means operable by the movement of the said reversing-gear for eliminating gas from the gas-engine cylinder while the steam-engine is in operation, the said gas-engine and steam-engine being severally operable whereby the operation of either will discharge the contents of the mixing-chamber.

6. In a combined steam and gas engine, the combination with a steam-engine cylinder, its reversing-gear, its piston and a piston-rod extending through both heads of said cylinder, of a gas-engine cylinder arranged in axial alinement with the steam-engine cylinder and having its piston attached to the piston-rod of the steam-cylinder, and a mixing-chamber communicating with the gas-engine cylinder and arranged between the steam-engine cylinder and the gas-engine cylinder and in axial alinement with both, and means whereby the movement of the reversing-gear of the steam-engine will open a port for the escape of gas from the gas-engine cylinder, the said gas-engine and steam-engine being severally operable whereby the operation of either will discharge the contents of the mixing-chamber.

In testimony whereof I have signed this specification in the presence of two subscribing witnesses.

CHARLES A. BRADEN.

Witnesses:

ALBERT L. BOWSER,

R. WILLETTS.